May 5, 1936. A. N. SMITH Re. 19,957

TRANSFORMER

Original Filed Dec. 27, 1933 2 Sheets-Sheet 1

Inventor

Anthony N. Smith

By

Eugene C. Stevens

Attorney

May 5, 1936. A. N. SMITH Re. 19,957
TRANSFORMER
Original Filed Dec. 27, 1933 2 Sheets-Sheet 2
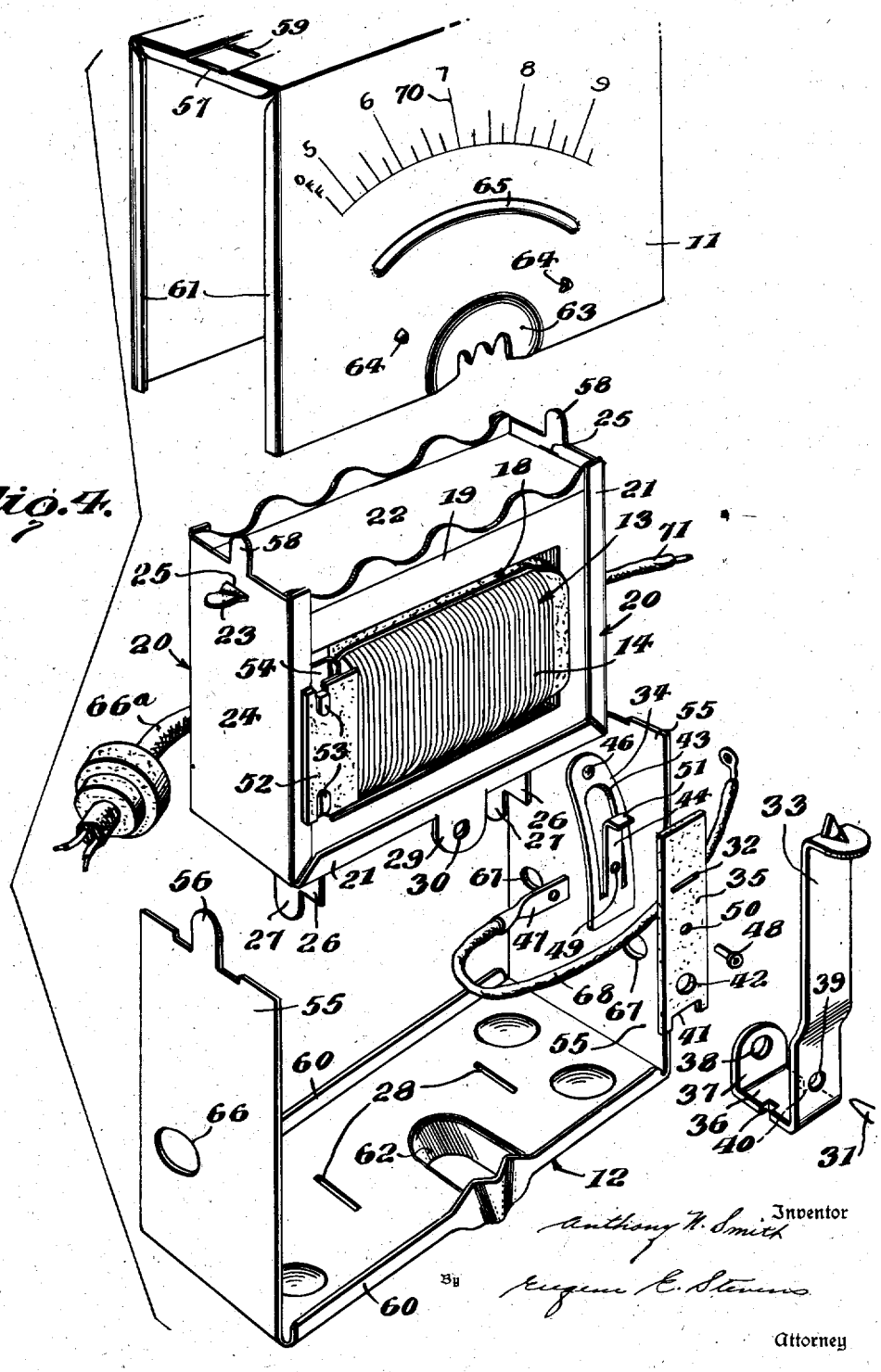
Anthony N. Smith Inventor
By Eugene E. Stevens
Attorney Reissued May 5, 1936

Re. 19,957

UNITED STATES PATENT OFFICE 19,957

TRANSFORMER

Anthony N. Smith, Girard, Pa., assignor, by mesne assignments, to The Girard Manufacturing Company, Girard, Pa., a corporation of Pennsylvania Original No. 2,019,196, dated October 29, 1935, Serial No. 704,178, December 27, 1933. Application for reissue November 30, 1935, Serial No. 52,426

24 Claims. (Cl. 171—119)

This invention relates to electrical apparatus, particularly to variable voltage step-down transformers for operating electrical toys, especially toy railroads, from a household power line.

The present disclosure deals with an embodiment wherein the apparatus is designed to permit manual regulation and control of current therein, between an in-put and out-put.

An object of this invention is the provision in an apparatus of such character, of a novel sliding contact with the control and the mounting therefor, to the end of obtaining a smooth continuous gradual variation of voltage, a convenient zero voltage or open circuit position, and a completely concealed and protected sliding contact system devoid of special spaced taps or contact elements with their added cost and their attendant operating difficulty by reason of open circuiting taking place between successive contact elements.

Another object is the provision, in such apparatus, of a self-contained coil mount and a sliding contact member adapted for support within a separable section casing.

A further object is the provision, in such apparatus, of a separable casing having sliding contact actuator means supported therein in slidably straddled engagement with a casing wall. Other objects will be apparent from the description. The present disclosure constitutes an exposition of the invention as reduced to practice. It is to be understood that the structural details thereof may be varied to any extent not inconsistent with the scope of the invention as claimed.

In the drawings:

Figure 4 is a dis-assembled perspective view of the various parts of the structure illustrated.

Figure 1:
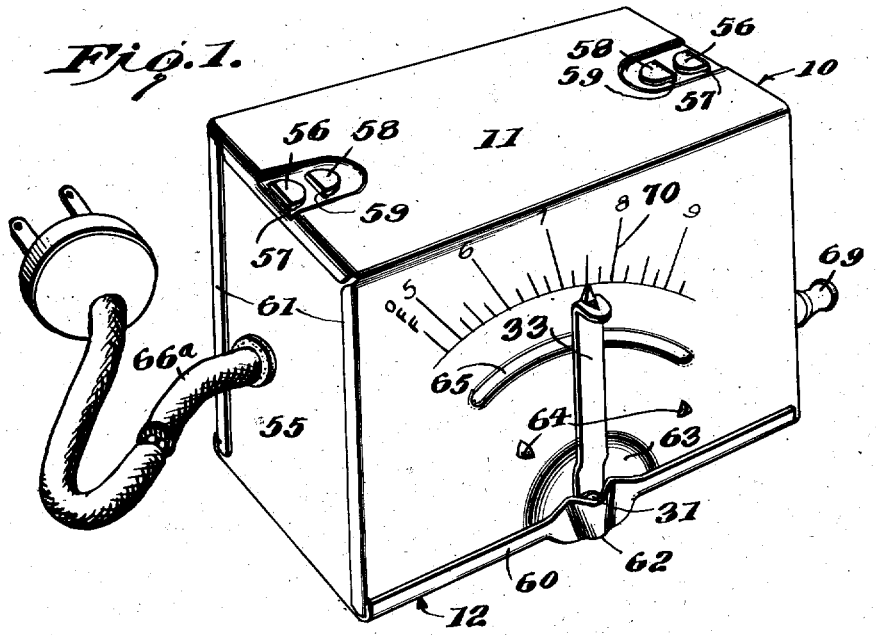
Figure 1 is an assembled perspective view of a structure made in accordance with the invention.

The embodiment shown in Figure 1 comprises a transformer 10 that is particularly adapted for use in connection with the operation of toy trains and other electrically operated toys. Its details comprise a cover section 11 that is separably connected by sliding inter-fitting engagement with a base section 12, both sections being constructed preferably of steel or other suitable material.

Secured within the housing is a transformer coil 13 having the usual primary and secondary windings 14 and 15 respectively. As shown in the drawings the secondary winding is composed of two layers of suitable wire, being separated from each other by the insulation 16. The layers are closely wound, the adjacent wires preferably being in side by side contact, as shown, when using insulated wire. The secondary winding encompasses the primary and is insulated therefrom as indicated at 17 or in any well known manner. The arrangement of the secondary winding into two layers permits of the outside layer carrying only one half of the total voltage, or in other words, one half maximum to minimum. It is to be understood, however, that the coil may be so constructed that the entire range from minimum to maximum may be had by the use of one layer.

The coil 13 is rigidly secured within an opening 18 formed by laminated core sections 19 thus forming a unitary structure or coil unit. To secure and properly position this unit within the housing, I have provided a frame 20 of substantially U-shaped construction. The coil unit, which embraces the laminated sections and coil per se, is held within the frame and restrained against movement therein by means of the side flanges 21 and the top portion 22. The top portion is provided with tongues 23 for engagement with the sides 24 through slots 25 formed therein. These tongues are twisted as distinguished from being bent at right angles in order to project laterally and serve to space the frame and coil from the housing, as clearly shown in Figures 2 and 4.

Depending legs 26, formed from the bottom portion of the frame, are secured to and rest upon the base 12 in a manner to space the frame therefrom. Tongues 27, integral with the legs 26 pass through slots 28 in the base for securely holding the frame thereto. The tongues, as a matter of course, being bent at right angles to perform this function.

Pivot bearings 29 in the form of depending flanges are formed from the bottom portion of the frame and are provided with openings 30 therein for the reception of a pivot pin or shaft 31.

The shaft 31 has mounted thereon a composite switch device which comprises an actuator, such as a finger piece 33, a contact element 34 and an insulating strip or means 35. The finger piece, as illustrated, is composed of a flat strip of metal, although insulating material could be used, having a lower portion 36 formed at right angles thereon, the end 37 thereof being turned upward and provided with a shaft opening 38. A similar opening 39 is also formed in the finger piece 33. The lower portion 36 of the finger piece is provided with slotted openings 40 for the reception of the bifurcated end 41 of the insulating strip 35, which construction securely holds the strip to the finger piece for movement therewith. A suitable pivot opening 42 is provided in the insulating strip 35 for the reception of the shaft 31.

The contact element 34 comprises a bowed strip of resilient metal, slotted as at 43 to form thereon a tongue 44. A depressed or indented nub 46 is positioned on the end of the contact element to actively form electrical contact between the contact element and the outer secondary winding of the coil as will be hereinafter set forth, the insulation of the wire, when insulated, being removed on the outer face of the coil. The rectangular section of the core gives the coil a flat face of substantial area on which the arcuate movement of the contact nub 46 is received. The mechanical movement is smooth and the voltage variation is gradual.

Interposed between the contact element 34 and the insulating strip 35 is a terminal connector 47, which is held therebetween by means of a rivet 48 which passes through openings 49 and 50 in the contact element and strip respectively. A projecting portion 51 on the tongue 44 fits within a slot 32 in the strip 35 and prevents relative movement between the strip and contact element.

At one side of the convolutions of the coil and flush therewith is mounted a flat strip of insulating material to form and function as a circuit cut-off 52. A suitable mounting 54 secured to one of the laminated sections serves to properly position the cut-off, the mount being provided with tongues 53, to rigidly hold the strip thereto.

The bottom section or base 12 carries the end walls 55 of the housing structure and these walls are provided with tongues 56 formed on the upper ends thereof, these tongues being so arranged as to be receivable through the slots 57 formed in the cover 11. The end walls of the frame 20 are also provided with tongues 58 receivable through slots 59 in the cover. When the housing sections are assembled, the tongues 56 and 58 project through the slots 57 and 59 respectively and are bent at right angles in a manner to securely hold the parts together.

The base 12 is so formed, as to provide a pair of upturned flange members 60 which properly position the cover 11 when assembled. Similar flange members 61 are formed on the ends of the cover and serve to prevent any spreading of the end walls of the base or bottom section.

A downwardly extending cup shaped portion 62 is formed on the bottom of the base in a flange 60 in a manner to permit of the free movement of the switch device, the cover being provided with a depressed portion 63 adjacent the cup shaped portion on the flange 60 to cooperate with the same for the free movement of the switch device. Suitable stops 64 formed on the front of the cover limit the movement of the finger piece 33. It will be noted that the front face of the cover carries a rib or guide 65 projecting inwardly in a manner to space the insulating strip away from the side wall of the cover. This rib functions to force the insulating strip towards the coil, and as a consequence of this action, the contact element, which is secured to the strip, is tensioned against a portion of the secondary winding of the coil or the cut-off 52, as the case may be.

The end walls of the base are provided with openings 66 and 67 which receive respectively the in-put cable 66a to the primary and the output terminal posts. A suitable cable 68 connects terminal connector 47 to a secondary or output terminal 69 positioned in one of the openings 67, the same being insulated from the end wall. It can be readily understood from this arrangement of the parts, that the switch device is interposed in the secondary circuit and the voltage controlled therethrough by movement of the switch device in relation to the coil.

Indicia 70 on the outside of the cover indicates to the operator the various positions in which to place the finger piece in order to obtain any desired voltage within the range provided by the secondary windings on the coil.

It will be noted that the frame is held in spaced relation to the housing, and that the top portion 22 is provided with cut-away portions, in order that a free circulation of air may be obtained to assist in cooling the coil unit.

Figure 2:
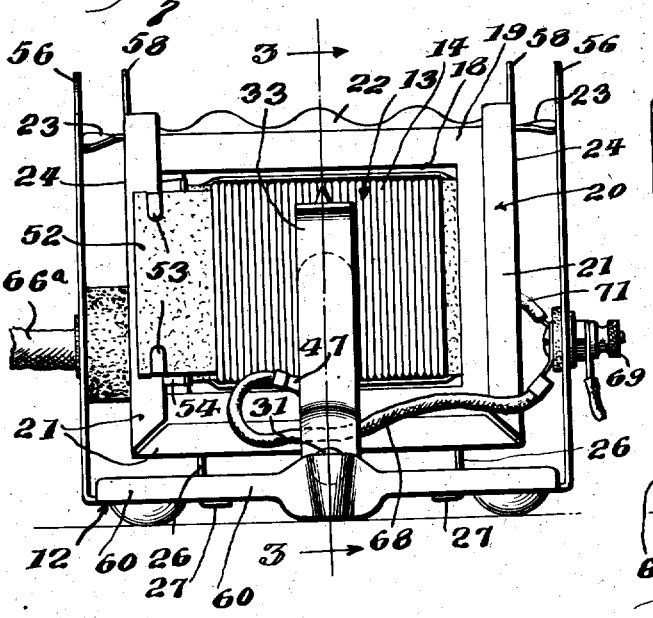
Figure 2 is an internal elevation with a section of the separable casing removed.
Figure 3:
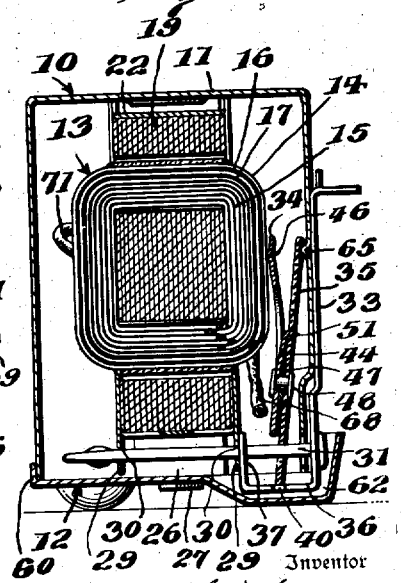
Figure 3 is a section taken on the line 3—3 of Figure 2.

In operation, the parts being assembled as shown in Figures 1 to 3 inclusive, the movement of the finger piece and associated parts towards the cut-off 52 will reduce the amount of voltage imparted through the secondary circuit as a small number of convolutions of wire on the secondary winding of the coil are in the circuit. It also follows that movement of the finger piece in the opposite direction will increase the amount of voltage as more convolutions are in the circuit. Continued movement of the finger piece towards the cut-off 52 will position the contact element on the insulating strip and break the circuit.

Cable 68 connects one side of the secondary coil with the terminal post 69 and the other side of the secondary coil is connected through wire 71 with a terminal post, not shown, mounted on a wall of the base 12 adjacent the terminal post 69.

The insulating strip 35 provides a mounting for the spring tensioned contact finger 34 and serves to maintain the contact finger out of any electrical contact with any portion of the casing structure. This insulating strip 35 is attached to the bight 36 in such manner that the insulating strip is moved by and in conjunction with the actuator arm or finger 33. Both actuator finger 33 and the insulating strip 35 are pivoted on the pintle 31 for free movement with respect thereto. The edge of the casing section 11 is suitably slotted adjacent the depressed portion 63 to accommodate the disposition of the pintle 31.

A feature of the invention resides in the fact that the actuator arm 33 and the insulator strip 35 straddle the adjacent edge of the casing cover section 11 in slidable relation to the opposed faces thereof. The cover section 11 is applied and disengaged by sliding between the actuator finger 33 and the insulator strip. This insures a positive disposition of the actuator finger on the exterior of the casing. It will be apparent that in this assembly the actuator and the contact finger are pivotally mounted upon the coil carrying frame and these elements do not have any connection either electrical or mechanical with either of the separable casing sections. In this construction no part of the secondary circuit passes through the actuator finger 33 or its pintle 31.

I claim as my invention:

1. In a current regulating device having a casing comprising base and closure sections, said closure sections providing a casing wall, a coil mount therein and secured to the base sections, and a conductor coil in said mount; means for establishing slidable contact with the conductor coil, means disposed externally of the closure-provided wall of the casing for moving said contact establishing means over said conductor coil, means carried by said coil mount and providing a pivot for said contact establishing means and its moving means, and an operating connection between said contact establishing means and the moving means therefor at one side of the pivot, said moving means straddling the lower edge of said closure provided casing wall adjacent said base whereby to admit of ready removal of the casing without interference with said moving means.

2. In a current regulating device having a casing, a coil mount therein, and a conductor coil in said mount; means for establishing contact with the conductor coil, an insulator member supporting said contact means, means on said coil mount providing a pivot for said insulator member, an actuator member having a portion pivotally connected to said pivot providing means, means supporting said actuator member on the coil mount, said actuator straddling a lower edge portion of a wall of said casing and having a portion disposed externally of the casing and unsupported thereby, and said insulator member having a fixed connection with said actuator member within the casing.

3. In a current regulating device, a casing, a coiled conductor therein, means supporting and anchoring said conductor in the casing in spaced relation from the walls thereof and comprising outwardly extending tongues, a manually operable contact member, means carried by said conductor supporting means and providing a pivot for said contact member, means externally of said casing for moving the contact member on its pivot over the conductor coils and supported solely by said pivot providing means, and an operating connection between said contact member and its moving means.

4. In a current regulating device having a casing and a conductor coil supported therein; a pivot pintle, a strip of insulating material freely pivoted on said pintle, an actuator finger freely pivoted on said pintle, means operatively connecting said strip and finger in fixed relation, a contact element carried by said strip and spaced from said pintle in slidable engagement with said conductor coil, and said actuator finger and insulating strip straddling a wall of the casing in slidable unsupported relation.

5. In a current regulating device, a separable-sections casing, a coiled conductor therein, a take-off contact member having sliding contact with the conductor coils, a support for said conductor, a pintle carried by said support and clear of the sections of said casing to permit ready separation and assembly thereof, an insulator member pivoted on said pintle, said contact member being carried by said insulating member, an actuator for said contact member pivoted on said pintle and disposed over the exterior of the casing, and an operative connection between said actuator and insulator member internally of the casing.

6. In a transformer structure, a casing, a transformer coil secured therein, a secondary lead for said coil, a switch device secured to said casing and provided with a contact element, a finger piece, insulating means securing said contact element and said piece together, and an electrical connection between said contact element and said lead, said contact element being capable of engaging said coil in a manner to vary the voltage of current passing through said lead.

7. In a transformer structure, a separable housing, a transformer coil located therein, a secondary lead for said coil, a switch device associated with said coil and operable without said housing, said device having a finger piece, a contact element, and insulating means securing said contact to said piece, a terminal connector interposed between said contact element and said means and connected to said lead, and said contact element engaging said coil in such manner that the voltage of current passing through said lead may be varied upon movement of said finger piece.

8. In a transformer structure, comprising a separable housing, a transformer coil within said housing, a secondary lead for said coil, a frame for holding said coil and spacing the same from said housing, said transformer having a finger piece, a contact element, and insulating means securing said contact to said piece, a terminal connector interposed between said contact element and said means and connected to said lead, and said contact element engaging said coil in such manner that the voltage of current passing through said lead may be varied upon movement of said finger piece.

9. In a transformer structure, a housing, a transformer coil within said housing, a secondary lead for said coil, a frame for holding said coil and spacing the same from said housing, a switch device associated with said coil and operatable without said housing, means pivotally connecting said switch device to said frame, said switch device having a finger piece, a contact element, and insulating means securing said contact to said piece, a terminal connector interposed between said contact element and said means and connected to said lead, and said contact element engaging said coil in such manner that the voltage of current passing through said lead may be varied upon movement of said finger piece.

10. In a transformer structure, a housing, a transformer coil within said housing, a secondary lead for said coil, a frame for holding said coil and spacing the same from said housing, a switch element contacting said coil within said housing and operable without said housing, means connecting said element and said lead, means insulating said element from said housing and normally urging said element towards said coil, and means controllable without said housing for positioning said element relative to said coil in such manner that the voltage of current passing through said lead may be varied.

11. In a transformer structure, a housing, a transformer coil having an exposed secondary winding positioned within said housing, a secondary lead for said coil, a contact element engaging said winding and connected to said lead, a finger piece for moving said contact element across the exposed surface of said winding, insulating means connecting said element to said piece and means co-acting with said finger piece for indicating the position of said element relative to said winding.

12. A variable voltage step-down transformer for operating electrical toys, especially toy railroads, from a household power line, said transformer comprising an iron core having a straight core leg rectangular in cross-section, a primary winding consisting of a number of layers of wire wound about said core, a flexible cord and plug joined thereto for connection to a power line, a secondary winding including a layer of closely wound wire surrounding said straight core leg, said layer having relatively flat side faces paralleling the flat sides of the core leg, a contact arm oscillatable about an axis disposed transversely of the core leg and offset sidewardly therefrom, the length and pivoting of the contact arm being so related to the secondary winding that the end of the contact arm may be swept entirely across the winding in an arcuate path while riding on one of the relatively flat side faces of the winding, thereby varying the output voltage in a smooth continuous manner, a casing surrounding said transformer and said contact arm, and a control handle outside said casing connected to the contact arm within the casing.

13. A variable voltage step-down transformer for operating electrical toys, especially toy railroads, from a household power line, said transformer comprising an iron core leg which is rectangular in cross-section, a primary winding consisting of a number of layers of wire wound about said core and adapted to be connected to a flexible cord and plug for connection to a power line, a secondary winding including a layer of closely wound wire surrounding said primary winding, said layer having relatively flat side faces paralleling the flat sides of the core leg, a contact arm oscillatable about an axis disposed transversely of the core leg and offset sidewardly therefrom, the length and pivoting of the contact arm being so related to the secondary winding that the end of the contact arm may be swept entirely across the winding in an arcuate path while riding on one of the relatively flat side faces of the winding, thereby varying the output voltage in a smooth continuous manner, a casing surrounding said transformer and said contact arm, means on said core for spacing the same from the walls of the casing, and a control handle outside of said casing connected to but insulated from the contact arm within the casing.

14. A variable voltage step-down transformer for operating electrical toys, especially toy railroads, from a household power line, said transformer comprising an iron core, a primary winding consisting of a number of layers of wire wound about said core, a flexible cord and plug joined thereto for connection to the power line, a secondary winding including a plurality of closely wound layers of wire connected in series or end to end, a movable contact arm, said contact arm being so related to the transformer winding that the end of the contact arm may be swept entirely across the outer layer of secondary winding to vary the output voltage in a smooth continuous manner between an intermediate and a maximum value, a pair of binding posts, one of which is connected to the inner end of the secondary winding, and the other of which is connected to said movable contact arm, and a control handle connected to the contact arm.

15. A variable step-down tranformer for operating electrical toys, especially toy railroads, from a household power line, said transformer comprising an iron core, a primary winding consisting of a number of layers of wire wound about said core and adapted to be connected to a flexible cord and plug for connection to the power line, a secondary winding including first and second layers of closely wound wire, a movable contact arm, said contact arm being so related to the transformer winding that the end of the contact arm may be swept entirely across the outer layer of secondary winding to vary the voltage in a smooth continuous manner from about half to maximum value, a pair of binding posts one of which is connected to the starting end of the inner layer of secondary winding, and the other of which is connected to said movable contact arm, and a control handle connected to the contact arm.

16. A variable voltage step-down transformer for operating electrical toys, especially toy railroads, from a household power line, said transformer comprising an iron core, a primary winding consisting of a number of layers of wire wound about said core, a flexible cord and plug joined thereto for connection to the power line, a secondary winding including a layer of closely wound wire about the outside of the primary winding, a contact arm oscillatable about an axis disposed transversely of the axis of the windings and offset sidewardly therefrom, the length and pivoting of the contact arm being so related to the transformer winding that the end of the contact arm may be swept across the winding in order to vary the output voltage in a smooth continuous manner, a casing surrounding said transformer and said contact arm, means on said core for positioning the same in spaced relation with respect to the walls of the casing, a pair of binding posts or connections one of which is connected to one end of the secondary winding and the other of which is connected to said movable contact arm, and a control handle outside said casing connected to the contact arm within the casing, said control handle being insulated from said contact arm.

17. A variable voltage step-down transformer for operating electrical toys, especially toy railroads, from a household power line, said transformer comprising an iron core, a primary winding consisting of a number of layers of wire wound about said core and adapted to be connected to a flexible cord and plug for connection to a power line, a secondary winding including a layer of closely wound wire wound about the outside of the primary winding, said layer being as long as the primary winding, a movable contact arm, said contact arm being so related to the transformer winding that the end of the contact arm may be swept entirely across the outer layer of winding to vary the voltage in a smooth continuous manner, a casing surrounding said transformer and said contact arm, means on said core for positioning the same in spaced relation with respect to the walls of the casing, a pair of binding posts or connections one of which is connected to one end of the secondary winding and the other of which is connected to said movable contact arm, a control handle outside said casing connected to the contact arm within the casing, stop means to limit the movement in either direction of the control handle and contact arm, the stop at one end permitting said contact arm to move beyond the transformer winding, and means disposed at said end of the transformer winding to receive and guide the contact arm during its continued movement beyond the transformer winding, said means being arranged approximately in the plane of the outer layer of winding.

18. A variable voltage step-down transformer for operating electrical toys, especially toy railroads, from a household power line, said transformer comprising an iron core, a primary winding consisting of a number of layers of wire wound about said core, a secondary winding including a layer of closely wound wire, a contact arm oscillatable about an axis disposed transversely of the axis of the secondary winding and offset sidewardly therefrom, the length and pivoting of the contact arm being so related to the winding that the end of the contact arm may be swept entirely across the winding in order to vary the output voltage in a smooth continuous manner, a casing surrounding said transformer and said contact arm, means on said core for positioning the same in spaced relation with respect to the walls of the casing, a control handle outside said casing connected to the contact arm within the casing, stop means to limit the movement of the control handle and contact arm, the stop at one end permitting said contact arm to move beyond the transformer winding, and a slab of material disposed at said end of the transformer winding to receive and guide the contact arm during its continued movement beyond the transformer winding.

19. A variable voltage step-down transformer for operating electrical toys, especially toy railroads, from a household power line, said transformer comprising a laminated H type iron core including center and outside legs joined by transverse end legs, a primary winding consisting of a number of layers of wire wound about said center leg, a flexible cord and plug joined thereto for connection to a power line, a secondary winding including a layer of closely wound wire about the outside of the primary winding, a contact arm oscillatable about an axis disposed transversely of the core legs and offset sidewardly from the center leg toward an outside leg, the length and pivoting of the contact arm being so related to the transformer winding that the end of the contact arm may be swept entirely across a side face of the winding in order to vary the output voltage in a smooth continuous manner.

20. A variable voltage step-down transformer for operating electrical toys, especially toy railroads, from a household power line, said transformer comprising a laminated H type iron core including center and outside legs joined by transverse end legs, a primary winding consisting of a number of layers of wire wound about said center leg and adapted to be connected to a flexible cord and plug for connection to a power line, a secondary winding including a layer of closely wound wire about the outside of the primary winding, a movable contact arm so arranged that the end thereof may be swept entirely across the outermost layer of winding in order to vary the output voltage in a smooth continuous manner, a casing surrounding said transformer and said contact arm, means on the exposed part of said core for positioning the same in spaced relation with respect to the walls of the casing, a control handle outside said casing connected to the contact arm within the casing, stop means to limit the movement of the control handle and contact arm, the stop at one end permitting said contact arm to move beyond the transformer winding, and a slab of material disposed at said end of the transformer winding to receive and guide the contact arm during its continued movement beyond the transformer winding.

21. A variable voltage step-down transformer for operating electrical toys, especially toy railroads, from a household power line, said transformer comprising a laminated H type iron core including center and outside legs joined by transverse end legs, a primary winding consisting of a number of layers of wire wound about said center leg, a flexible cord and plug joined thereto for connection to a power line, a secondary winding including a layer of closely wound wire about the outside of the primary winding, a contact arm oscillatable about an axis disposed transversely of the core legs and offset sidewardly from the center toward an outside leg, the length and pivoting of the contact arm being so related to the transformer winding that the end of the contact arm may be swept entirely across one side face of the winding in order to vary the voltage in a smooth continuous manner, a casing surrounding said transformer and said contact arm, a control handle outside said casing connected to the contact arm within the casing, stop means to limit the movement of the control handle and contact arm, the stop at one end permitting said contact arm to move beyond the transformer winding to open-circuit the secondary circuit, and a slab of insulation material disposed at said end of the transformer winding to receive and guide the contact arm during its continued movement beyond the transformer winding.

22. A variable voltage step-down transformer for operating electrical toys, especially toy railroads, from a household power line, said transformer comprising a laminated H type iron core including center and outside legs joined by transverse end legs, a primary winding consisting of a number of layers of wire wound about said center leg and adapted to be connected to a flexible cord and plug for connection to a power line, a secondary winding including first and second layers of closely wound wire about the outside of the primary winding, a movable contact arm so arranged that the end of the contact arm may be swept entirely across the outer layer of secondary winding to vary the voltage in a smooth continuous manner from about half to maximum value, stops to limit the movement of the contact arm, the stop at the low voltage end permitting the contact arm to move beyond the winding.

23. A variable voltage step-down transformer for operating electrical toys, especially toy railroads, from a household power line, said transformer comprising a laminated H type iron core with a center leg rectangular in cross-section, a primary winding consisting of a number of layers of wire wound about said center leg, a flexible cord and plug joined thereto for connection to a power line, a secondary winding including a layer of closely wound wire about the outside of the primary winding, a contact arm oscillatable about a pivot disposed transversely of the legs of the core and offset sidewardly therefrom, the length and pivoting of the contact arm being so related to the transformer winding that the end of the contact arm may be swept entirely across one of the flat side faces of the winding to vary the output voltage in a smooth continuous manner, a casing surrounding said transformer and said contact arm, means on the exposed part of said core for positioning the same in spaced relation with respect to the walls of the casing, a pair of binding posts or connections, one of which is connected to one end of the secondary winding and the other of which is connected to said movable contact arm, and a control handle outside said casing connected to the contact arm within the casing, said control handle being insulated from said contact arm.

24. A variable voltage step-down transformer for operating electrical toys, especially toy railroads, from a household power line, said transformer comprising a laminated H type iron core, a primary winding consisting of a number of layers of wire wound about the center leg of the core and adapted to be connected to a flexible cord and plug for connection to a power line, a secondary winding including first and second layers of closely wound wire about the outside of the primary winding, a contact arm oscillatable about a pivot disposed transversely of the core legs and offset from the center leg, the length and pivoting of the contact arm being so related to the transformer winding that the movable end of the contact arm may be swept across the outside layer from one end of the layer to the other in order to vary the voltage in a smooth continuous manner, a casing surrounding said transformer and said contact arm, a pair of binding posts or connections one of which is connected to the inner end of the secondary winding and the other of which is connected to said movable contact arm, a control handle outside said casing connected to the contact arm within the casing, stop means to limit the movement of the control handle and contact arm, the stop at the low voltage end permitting said contact arm to move beyond the transformer winding, and a slab of material disposed at said end of the transformer winding to receive and guide the contact arm during its continued movement beyond the transformer winding.

ANTHONY N. SMITH.